(12) United States Patent
Steiner

(10) Patent No.: US 10,200,780 B2
(45) Date of Patent: Feb. 5, 2019

(54) METHOD AND APPARATUS FOR CONVEYING BATTERY LIFE OF WIRELESS EARPIECE

(71) Applicant: BRAGI GmbH, München (DE)

(72) Inventor: Martin Steiner, München (DE)

(73) Assignee: BRAGI GmbH, München (DE)

(*) Notice: Subject to any disclaimer, the term of this patent is extended or adjusted under 35 U.S.C. 154(b) by 0 days.

(21) Appl. No.: 15/687,126

(22) Filed: Aug. 25, 2017

(65) Prior Publication Data

US 2018/0063629 A1    Mar. 1, 2018

Related U.S. Application Data

(60) Provisional application No. 62/380,782, filed on Aug. 29, 2016.

(51) Int. Cl.
*H02J 7/00* (2006.01)
*H04R 1/10* (2006.01)
*H04R 5/033* (2006.01)

(52) U.S. Cl.
CPC ...... *H04R 1/1091* (2013.01); *H02J 2007/005* (2013.01); *H04R 1/1016* (2013.01);
(Continued)

(58) Field of Classification Search
CPC .. H04R 1/1091; H04R 2420/07; H04R 5/033; H04R 2460/03; H02J 7/0047; H02J 2007/005; H02J 2007/0049; H02J 7/0021
(Continued)

(56) References Cited

U.S. PATENT DOCUMENTS 2,325,590 A    7/1943  Carlisle et al.
2,430,229 A   11/1947  Kelsey
(Continued)

FOREIGN PATENT DOCUMENTS

CN    204244472 U    4/2015
CN    104683519 A    6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Vivian Chin
*Assistant Examiner* — Con P Tran
(74) *Attorney, Agent, or Firm* — Goodhue, Coleman & Owens, P.C.

(57) ABSTRACT

A system includes a left earpiece comprising a left earpiece housing and a right earpiece comprising a right earpiece housing and a radio transceiver disposed within at least one of the left earpiece and the right earpiece, and a software application executable on a computing device in operative communication with the radio transceiver; wherein the software application provides a visual representation of the left earpiece and a visual representation of the right earpiece and wherein the visual representation of the left earpiece indicates a remaining charge for the left earpiece and wherein the visual representation of the right earpiece indicates a remaining charge for the right earpiece. A method for displaying battery life is also provided.

8 Claims, 5 Drawing Sheets

(52) U.S. Cl.
CPC .......... *H04R 5/033* (2013.01); *H04R 2420/07* (2013.01); *H04R 2460/03* (2013.01)

(58) Field of Classification Search
USPC .......... 381/74, 58, 380, 151, 311, 388, 323; 455/573, 572, 67.11; 320/114, 128
See application file for complete search history.

(56) References Cited

U.S. PATENT DOCUMENTS

| | | | |
|---|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Pickens et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,112,066 B2 | 2/2012 | Ayed |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin |
| 8,436,780 B2 | 5/2013 | Schantz et al. |
| 8,467,770 B1 | 6/2013 | Ayed |
| D687,021 S | 7/2013 | Yuen |
| 8,548,532 B1 | 10/2013 | Ng |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |

(56) References Cited

U.S. PATENT DOCUMENTS

| | | |
|---|---|---|
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0201137 A1 | 8/2008 | Vos et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0215921 A1 | 9/2011 | Ayed et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0065617 A1 | 3/2013 | Peled |
| 2013/0137491 A1 | 5/2013 | Tanaka et al. |
| 2013/0273849 A1* | 10/2013 | Sharma ............ H04M 1/05 455/41.2 |
| 2013/0316642 A1 | 11/2013 | Newham |
| 2013/0316679 A1 | 11/2013 | Miller et al. |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0200883 A1 | 7/2014 | Usher et al. |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270191 A1 | 9/2014 | Nikles |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0198994 A1* | 7/2015 | Kajitani ............ G06F 1/1616 348/738 |
| 2015/0226621 A1 | 8/2015 | Zhu et al. |
| 2015/0245127 A1 | 8/2015 | Shaffer |
| 2015/0304757 A1* | 10/2015 | Kim ............ H04R 1/1041 381/74 |
| 2015/0370527 A1* | 12/2015 | Goldstein ............ H04R 1/1091 700/94 |
| 2016/0021229 A1 | 1/2016 | Lewis et al. |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0360350 A1 | 12/2016 | Watson et al. |
| 2017/0013360 A1 | 1/2017 | Hviid |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0105622 A1 | 4/2017 | Boesen et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0111834 A1 | 4/2017 | Belverato |
| 2017/0139668 A1 | 5/2017 | Steiner |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151956 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0257694 A1 | 9/2017 | Boesen |
| 2017/0257698 A1 | 9/2017 | Boesen et al. |
| 2017/0257717 A1 | 9/2017 | Milevski et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |

(56) References Cited

FOREIGN PATENT DOCUMENTS

| | | |
|---|---|---|
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2015).
BRAGI Update—Years of Development, Moments of Utter Joy and Finishing What We Started(Jun. 1, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping up, (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview, (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, California (2017).
International Search Report & Written Opinion, PCT/EP2016/070231 (dated Nov. 18, 2016).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

METHOD AND APPARATUS FOR CONVEYING BATTERY LIFE OF WIRELESS EARPIECE

PRIORITY STATEMENT

This application claims priority to U.S. Provisional Patent Application 62/380,782, filed on Aug. 29, 2016, and entitled Method and apparatus for conveying battery life of wireless earpiece, hereby incorporated by reference in its entirety.

FIELD OF THE INVENTION

The present invention relates to wearable devices. More particularly, but not exclusively, the present invention relates to earpieces.

BACKGROUND

Knowing the battery life of an earpiece is important to ensure that a user does not unexpectedly lose power while using the earpiece. While visual indicators on an earpiece are useful, they are inconvenient due to the fact that the user is likely wearing the earpieces and thus would have to take an earpiece out to find out how much power remains on the earpiece or possibly look in a mirror. What is needed is a system and method of visually providing the battery life of an earpiece without requiring a user to remove one or both earpieces.

SUMMARY

Therefore, it is a primary object, feature, or advantage of the present invention to improve over the state of the art.

It is a further object, feature, or advantage of the present invention to show remaining battery life or remaining battery charge of an earpiece using a software application executed a computing device.

It is a still further object, feature, or advantage of the present invention to show remaining battery charge of an earpiece using a software application executed on a mobile device.

Another object, feature, or advantage is to show remaining battery charge of an earpiece using a software application on a computing device using a visual representation of a corona of the earpiece.

Yet another object, feature, or advantage is to provide a historical battery usage pattern broken down by hardware or software functions or programs used.

In one implementation, a system includes a left earpiece comprising a left earpiece housing and a right earpiece comprising a right earpiece housing and a radio transceiver disposed within at least one of the left earpiece and the right earpiece, and a software application executable on a computing device having a screen display element in operative communication with the radio transceiver, wherein the software application provides a visual representation of the left earpiece and a visual representation of the right earpiece on the screen display element and wherein the visual representation of the left earpiece indicates a remaining charge for the left earpiece and wherein the visual representation of the right earpiece indicates a remaining charge for the right earpiece.

One or more of the following features may be included. The visual representation may include a representation of a lighting element of the right earpiece lit to a color indicative of the remaining charge and wherein the visual representation of the left earpiece includes a representation of a lighting element of the left earpiece lit to a color indicative of the remaining charge. The lighting element of the right earpiece may be part of a corona and wherein the lighting element of the left earpiece is a part of a corona. The software application may include a user interface. The user interface may include screen elements indicative of a battery life of the left earpiece and the right earpiece. The radio transceiver may transmit a historical profile of the battery usage of the left earpiece and the right earpiece to the computing device. The historical profile of the battery usage of the left earpiece and the right earpiece may be visually displayed on the screen display element using the user interface. The historical profile of the battery usage of the left earpiece and the right earpiece may be visually displayed on the screen display element using the screen elements indicative of the battery usage. The historical profile of the battery usage of the left earpiece and the right earpiece may be formatted by time. The historical profile of the battery usage of the left earpiece and the right earpiece may provide battery usage patterns. The battery usage patterns may be formatted by programs used or hardware or software functions performed with one or more wireless earpieces. Remaining battery life may be conveyed in any number of different ways including as a percentage of a full capacity charge remaining and/or the amount of time remaining if performing a particular function or set of functions. The computing device may be a mobile device.

In another implementation, a method for displaying battery life of at least one wireless earpiece on a computing device includes receiving battery life information from the at least one wireless earpiece and displaying the battery life or usage information on a screen display element of the computing device using a software application stored on the computing device.

One or more of the following features may be included. The battery life information may be synchronized to a visual representation of a left earpiece and a right earpiece displayed on the screen display element of the computing device using the software application, wherein the visual representation of the left earpiece and the right earpiece further displays the battery life information of the left earpiece and the right earpiece. The visual representation of the left earpiece and a right earpiece may further comprise a left earpiece corona and a right earpiece corona, wherein the left earpiece corona is chromatically illuminated in proportion to the remaining battery life of the left earpiece and the right earpiece corona is chromatically illuminated in proportion to the remaining battery life of the right earpiece. The method may further comprise a historical profile of the battery life of one or more wireless earpieces. The software application may comprise a user interface. The user interface may be used to display the historical profile of one or more wireless earpieces.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an object, feature, or advantage stated herein.

According to one aspect, a system includes a left earpiece having a left earpiece housing and a right earpiece having a right earpiece housing and a radio transceiver disposed within at least one of the left earpiece and the right earpiece. The system further includes a software application executable on a computing device having a screen display element in operative communication with the radio transceiver. The left earpiece may further include a left corona operatively connected to the left earpiece housing and having a light tube and at least one lighting element. The right earpiece may further include a right corona operatively connected to the right earpiece housing and having a light tube and at least one lighting element. The software application provides a visual representation of the left earpiece and a visual representation of the right earpiece on the screen display element of the computing device and the visual representation of the left earpiece indicates a remaining charge for the left earpiece and the visual representation of the right earpiece indicates a remaining charge for the right earpiece. The visual representation of the right earpiece includes a representation of the right corona of the right earpiece lit to a color indicative of the remaining charge of the right earpiece and wherein the visual representation of the left earpiece includes a representation of a lighting element of the left corona of the left earpiece lit to a color indicative of the remaining charge of the left earpiece. The radio transceiver transmits a historical profile of battery usage of the left earpiece and the right earpiece to the computing device. The historical profile of the battery life of the left earpiece and the right earpiece is visually displayed on the screen display element. The computing device may be a mobile device.

According to another aspect, a method for displaying battery life of at least one wireless earpiece on a computing device includes steps of receiving battery life information from the at least one wireless earpiece, displaying the battery life information on a screen display element of the computing device using a software application stored on the computing device, and synchronizing the battery life information to a visual representation of a left earpiece and a right earpiece displayed on the screen display element of the computing device using the software application, wherein the visual representation of the left earpiece and the right earpiece further displays the battery life information of the left earpiece and the right earpiece. The visual representation of the left earpiece and the right earpiece may further include a left earpiece corona and a right earpiece corona, wherein the left earpiece corona is chromatically illuminated in proportion to the remaining battery life of the left earpiece and the right earpiece corona is chromatically illuminated in proportion to the remaining battery life of the right earpiece. The method may further include receiving a historical profile of the battery life of the at least one wireless earpiece. The method may further include displaying the historical profile of the at least one wireless earpiece by the software application on a display associated with the computing device.

According to another aspect, a system may include a left earpiece having a left earpiece housing and a right earpiece having a right earpiece housing and a radio transceiver disposed within at least one of the left earpiece and the right earpiece. The system may further include a software application executable on a computing device having a screen display element in operative communication with the radio transceiver. The left earpiece may further include a left corona operatively connected to the left earpiece housing and may include a light tube and at least one lighting element. The right earpiece may further include a right corona operatively connected to the right earpiece housing and having a light tube and at least one lighting element. The software application may provide a visual representation of the left earpiece and a visual representation of the right earpiece on the screen display element of the computing device. The visual representation of the left earpiece and the right earpiece may further include a left earpiece corona and a right earpiece corona, wherein the left earpiece corona is chromatically illuminated in proportion to the remaining battery life of the left earpiece and the right earpiece corona is chromatically illuminated in proportion to the remaining battery life of the right earpiece. The visual representation of the right earpiece may include a representation of the right corona of the right earpiece lit to a color indicative of the remaining charge of the right earpiece. The visual representation of the left earpiece may include a representation of a lighting element of the left corona of the left earpiece lit to a color indicative of the remaining charge of the left earpiece. The radio transceiver may transmit a historical profile of battery usage of the left earpiece and the right earpiece to the computing device. The historical profile of the battery life of the left earpiece and the right earpiece may be visually displayed on the screen display element. The computing device may be a mobile device.

Various of the figures include ornamental appearance for various elements. It is to be understood that the present invention contemplates all permutations and combinations of the various graphical elements set forth in the screen displays and any portions thereof.

DETAILED DESCRIPTION

The present invention relates to wearable devices. More particularly, but not exclusively, the present invention relates to earpieces. According to some aspects, the present invention relates to sets of wearable devices, that is to say a set or group of more than one device that communicate with one another and/or with another device. Thus, for example, where the wearable devices are wireless earpieces, the set may include a left wireless earpiece and a right earpiece.

Figure 1:
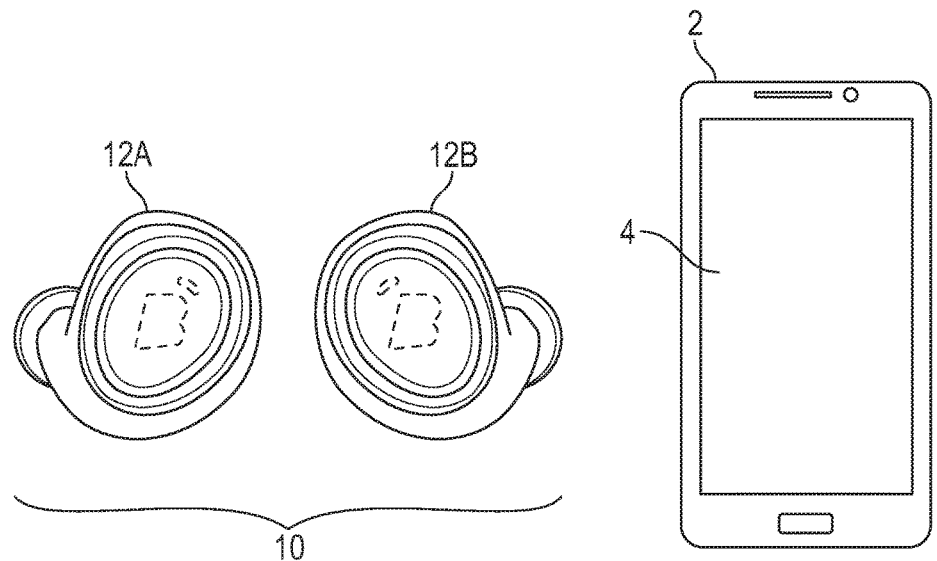
FIG. 1 illustrates a system including a set of wearable earpieces and a mobile device.

FIG. 1 illustrates a set of earpieces 10 including a left earpiece 12A and a right earpiece 12B. Each of the left earpiece 12A and the right earpiece 12B is in operative communication with a mobile device 2 which includes a screen display 4. The screen display 4 may be a touch-sensitive screen display or the mobile device 2 may otherwise provide for manual inputs.

Figure 2:
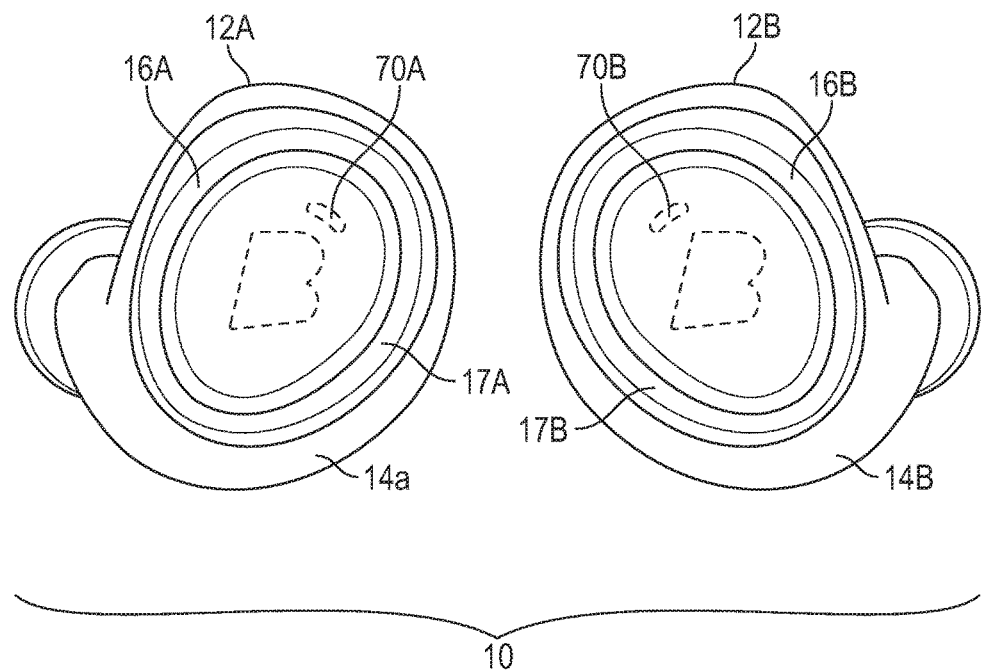
FIG. 2 illustrates a set of wearable earpieces in greater detail.

FIG. 2 illustrates in greater detail the set of earpiece wearables 10 which includes a left earpiece 12A and a right earpiece 12B. Each of the earpiece wearables 12A, 12B has an earpiece wearable housing 14A, 14B which may be in the form of a protective shell or casing and may be an in-the-ear earpiece housing. A left corona 16A is shown and a right corona 16B is shown. Each corona may formed from a light tube 17A, 17B or other light guide and one or more lighting elements such as one or more LEDs. Multiple LEDs may be used to provide different colors. Each earpiece 12A, 12B may include one or more microphones 70A, 70B. Note that the air microphones 70A, 70B are outward facing such that the air microphones 70A, 70B may capture ambient environmental sound. It is to be understood that any number of microphones may be present including air conduction microphones, bone conduction microphones, or other audio sensors.

Figure 3:
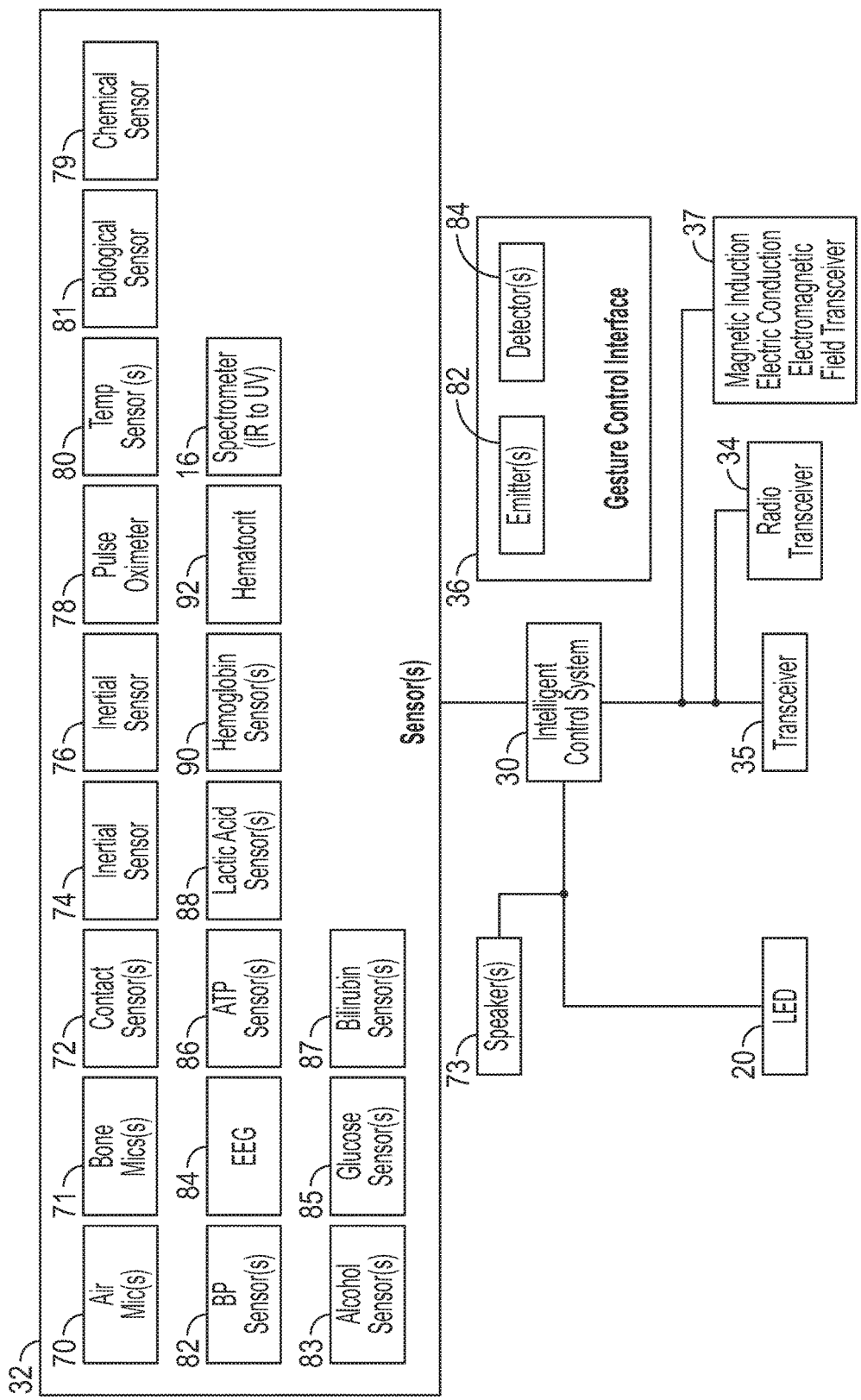
FIG. 3 is a block diagram illustrating one example of an earpiece.

FIG. 3 is a block diagram illustrating the left earpiece or the right earpiece wearable. The earpiece wearable device may include one or more LEDs 20 electrically connected to an intelligent control system 30. The LEDs 20 may be used in the corona of the earpiece in order to light up a light tube or other light guide. The intelligent control system 30 may include one or more processors, microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor.

A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. In operation, the intelligent control system 30 may be configured to convey different information using one or more of the LED(s) 20 based on context or mode of operation of the device. The various sensors 32, the processor 30, and other electronic components may be located on the printed circuit board of the device. The LED(s) 20 may be used to light a light tube or other light guide of a corona of the device. The level of remaining battery charge may be conveyed in various ways including by the color of the lighting. One or more speakers 73 may also be operatively connected to the intelligent control system 30.

A magnetic induction electric conduction electromagnetic (E/M) field transceiver 37 or other type of electromagnetic field receiver is also operatively connected to the intelligent control system 30 to link the processor 30 to the electromagnetic field of the user. The use of the E/M transceiver 37 allows the device to link electromagnetically into a personal area network or body area network or other device.

Although a number of different components are shown in FIG. 3, it is to be understood that an earpiece wearable need not include all of the various components and may only include a subset of the components. For example, in one embodiment the earpieces only serve as a set of wireless earpieces without microphones, without physiological sensors, and need not include storage. It is to be further understood that where there is a set of earpieces some of the components may be present only in one of the earpieces within the set. For example, not all sensors 32 need be present in each earpiece.

Figure 4:
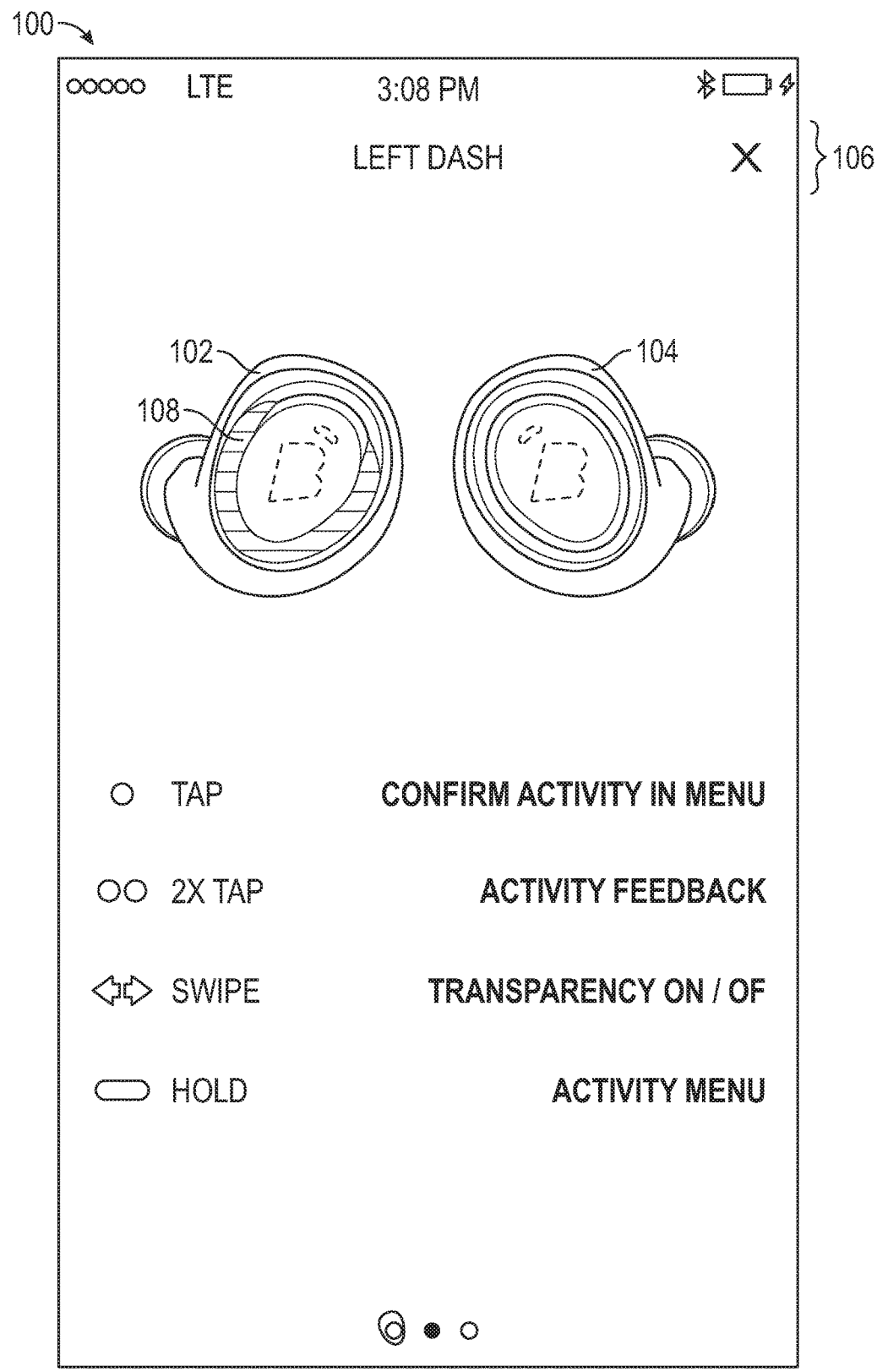
FIG. 4 illustrates one example of a screen display associated with a left earpiece.

FIG. 4 illustrates one example of a screen display 100 associated with a software application or mobile app executing on a processor of a mobile device. The screen display illustrates both a left earpiece 102 and a right earpiece 104. The screen display 100 includes a caption or label 106 indicating the "left" earpiece. In addition, portions of the left earpiece are illuminated using one or more LEDs. This portion of the earpiece may be called a corona 108. Thus, a user using the mobile app may quickly and easily see the amount of remaining battery charge available for each earpiece by looking at the representation of the corona on the screen display. A fully charged battery may be represented by the illumination of the entire corona, wherein the color of the illumination may be one or more variations of greenish or bluish hues (or other colors). A battery that is only partially charged may be represented by an incompletely illuminated corona, and the color may change from green or blue to a more yellowish hue (or other colors). A battery that is nearly spent may be represented by a corona that is only illuminated in one small section, and the color may change to a more reddish hue. The corona may even blink if the battery is nearly spent, with the blinking becoming more frequent and/or the hue becoming more reddish the closer the battery gets to loss of charge. Under the representation of the earpieces which may be a photo or photo-realistic representation of the earpieces is information relating to the gestures or controls associated with the earpiece. Note that textual descriptions of the commands are shown at the right and a pictorial representation or symbol or icon or graphic associated with the gesture is shown at left. Thus, here, a single dot is shown which is intended to correspond with a single tap or "TAP." The function associated with this user control, in this instance "CONFIRM ACTIVITY IN MENU" is shown. Next, two dots are shown which intended to correspond with a double tap or "2×TAP." The function associated with this user control, in this instance, "ACTIVITY FEEDBACK" is shown. Next, a left pointing arrow adjacent a right point arrow is shown. This visual representation is intended to correspond with a swipe or "SWIPE." The function associated with this user input, in this instance, "TRANSPARENCY ON/OFF" is shown. Next, an ellipse or oblong shape is shown. This visual representation is intended to correspond with a hold or "HOLD." The function associated with this user input, in this instance "ACTIVITY MENU" is shown. Thus, the screen display of FIG. 4 illustrates that a user may perform various actions through manipulation of the left earpiece using a set of gestures which may include a single tap, a double tap, a swipe, and/or a hold.

Figure 5:
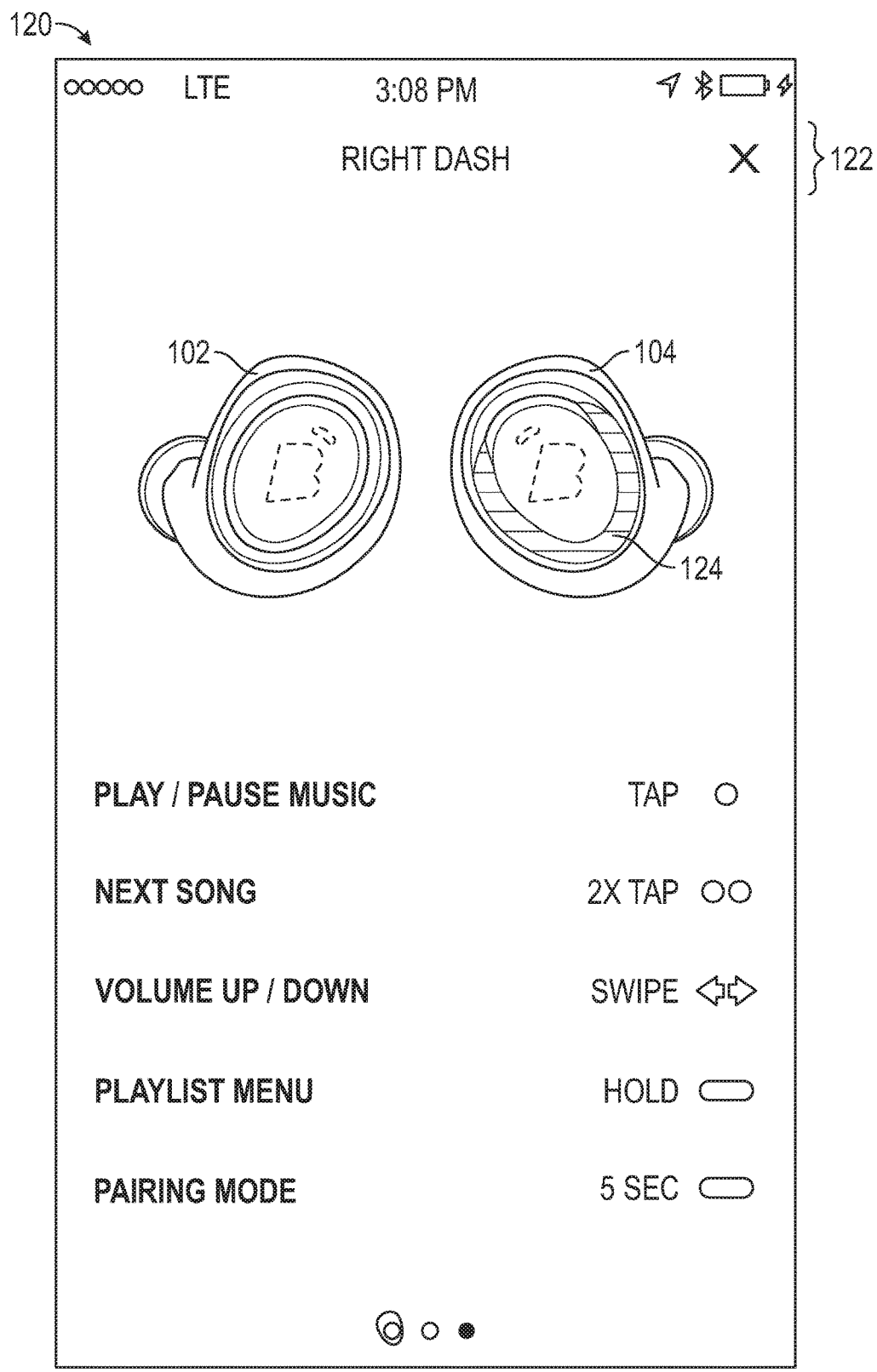
FIG. 5 illustrates one example of a screen display associated with a right earpiece.

FIG. 5 illustrates another example of a screen display 120 associated with a software application or mobile app executing on a processor of a mobile device. The screen display illustrates both a left earpiece 102 and a right earpiece 104. The screen display 120 includes a caption or label 122 indicating the "right" earpiece. In additions, portions of the right earpiece are illuminated using one or more LEDs and one or more light guides may be used in combination with the one or more LEDs. This portion of the earpiece may be called a corona 124. Thus, a user using the mobile app may quickly and easily see the amount of battery charge available for each earpiece by looking at the representation of the corona on the screen display. A full battery may be represented by the illumination of the entire corona, wherein the color of the illumination may be one or more variations of greenish or bluish hues. A battery that is only partially charged may be represented by an incompletely illuminated corona, and the color may change from green or blue to a more yellowish hue. A battery that is nearly fully discharged may be represented by a corona that is only illuminated in one small section, and the color may change to a more reddish hue. The corona may even blink if the battery is nearly spent, with the blinking becoming more frequent and/or the hue becoming more reddish the closer the battery gets to its expiration. Under the representation of the earpieces which may be a photo or photo-realistic representation of the earpieces is information relating to the gestures or controls associated with the earpiece. Note that textual descriptions of the commands are shown at the left and a pictorial representation or symbol or icon or graphic associated with the gesture is shown at right. Thus, here a single dot is shown which is intended to correspond with a single tap or "TAP." The function associated with this user control, in this instance "PLAY/PAUSE MUSIC" is shown. Next, two dots are shown which intended to correspond with a double tap or "2xTAP." The function associated with this user control, in this instance, "NEXT SONG" is shown. Next, a left pointing arrow adjacent a right point arrow is shown. This visual representation is intended to correspond with a swipe or "SWIPE." The function associated with this user input, in this instance, "VOLUME UP/DOWN" is shown. Next, an ellipse or oblong shape is shown. This visual representation is intended to correspond with a hold or "HOLD." The function associated with this user input, in this instance "PLAYLIST MENU" is shown. Thus, the screen display of FIG. 5 illustrates that a user may perform various actions through manipulation of the right earpiece using a set of gestures which may include a single tap, a double tap, a swipe, and/or a hold.

Note also, that as shown in FIG. 4 and FIG. 5, the same gestures may perform different actions depending upon whether the gesture is performed on the left earpiece or the right earpiece. It is contemplated, however, that different gestures may be used on different earpieces and the same gestures may perform the same functions on different earpieces. In addition, instead of using the gesture control of the earpieces to perform particular actions other types of user input may be used as well. This includes voice control or using the interface associated with the device executing the software application such as a touchscreen or manual inputs.

Figure 6:
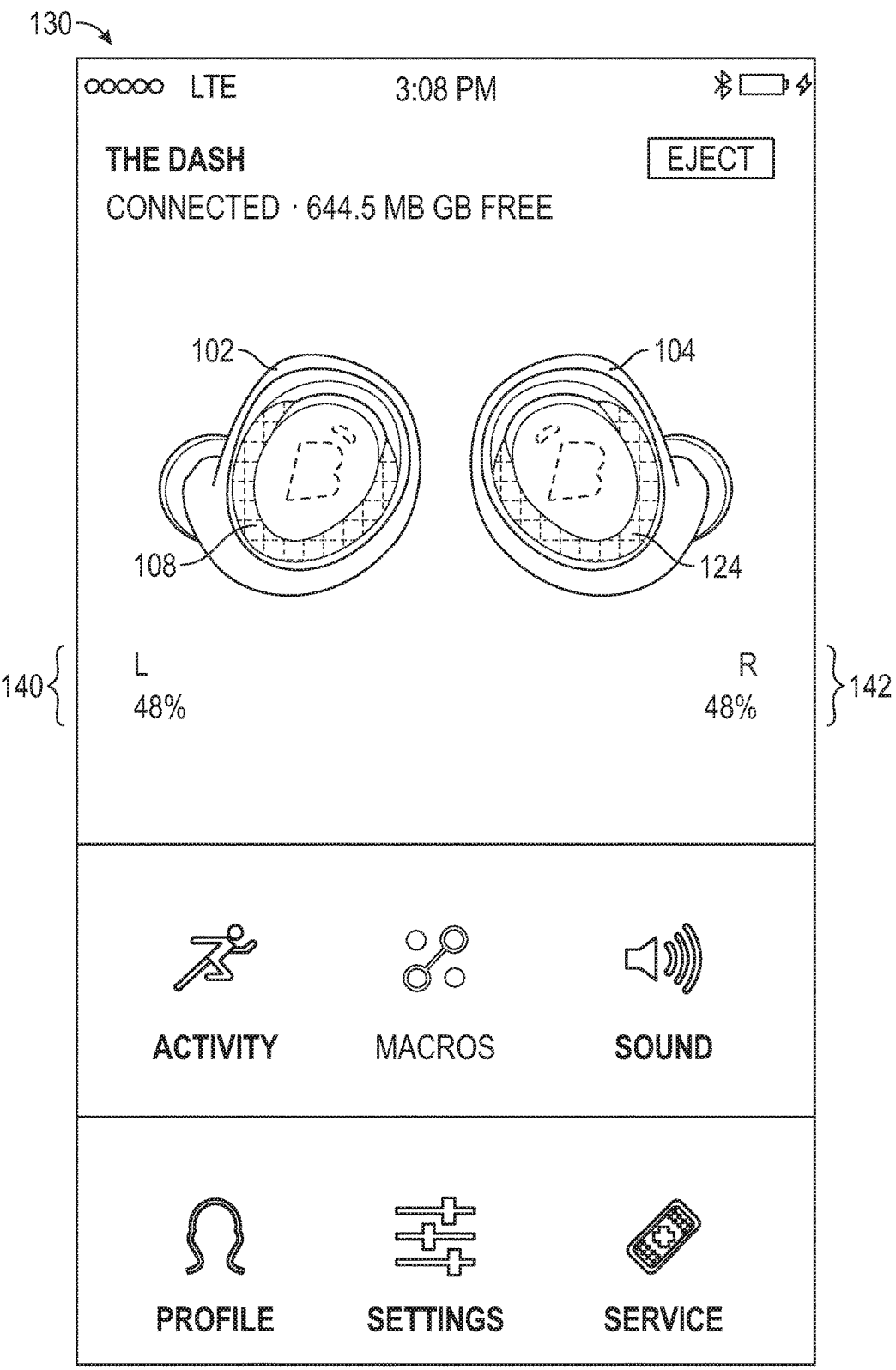
FIG. 6 illustrates another example of a screen display showing charge levels of both a left earpiece and a right earpiece and an activity menu with various items.

FIG. 6 illustrates another example of a screen display 130 associated with a software application or mobile app executing on a processor of a mobile device. In this screen display 130 a left earpiece 102 and a right earpiece 104 are shown. Underneath the left earpiece 102 is textual information 140 including an "L" indicating that this is the left earpiece. Underneath the "L" is further textural information in the form of a numerical representation of remaining battery life for the left earpiece, in this instance, "48%." Underneath the right earpiece is textual information 142 including an "R" indicating that this is the right earpiece. Underneath the "R" is textual information in the form of a numerical representation of remaining battery life for the right earpiece, in this instance, "48%." Although the battery charge level or remaining battery life is the same for both the left earpiece and the right earpiece in this example, it is to be understood that the left earpiece and the right earpiece may be different and that charge levels may be independently determined for each earpiece. Thus, a user using the mobile app may quickly and easily see the amount of battery charge available for each earpiece. In addition, the battery charge may be represented by the illumination of at least a portion of the corona 108, 124. A fully charged battery may be represented by the illumination of the entire corona, wherein the color of the illumination may be one or more variations of greenish or bluish hues. A battery that is only partially charged may be represented by an incompletely illuminated corona, and the color may change from green or blue to a more yellowish hue. A battery that is nearly fully discharged may be represented by a corona that is only illuminated in one small section, and the color may change to a more reddish hue. The corona may even blink if the battery is nearly spent, with the blinking becoming more frequent and/or the hue becoming more reddish the closer the battery gets to becoming fully discharged.

In addition, it is contemplated that historical battery usage information may be displayed. This may include information about how a battery has been used. This may include the number of minutes of audio playback which have been performed, the number of minutes of fitness tracking which have been performed, or other examples of the amount of time that particular functions have been performed. Similarly, when representing the amount of battery charge remaining, the amount of battery charge remaining may be expressed as the number of minutes of audio playback or the number of minutes of fitness tracking, or the number of minutes of remaining battery usage backed on a typical usage profile for the individual. Conveying remaining battery charge in this manner assists a user in better understanding when they should next charge their earpieces based on their anticipated uses to help them better plan to avoid fully discharging the battery at an inconvenient time.

It is to be understood that an application may be developed for any number of operating systems or platforms and may be distributed in any number of ways. These may include that the app be developed for the iOS operating system for an Apple mobile device such as an iPhone or iPad and distributed through the App Store. The app may be developed for the Android operating system for an Android device and distributed through Google Play or another Android app marketplace. The app may be developed for Windows or for any number of other operating systems.

Therefore, methods and systems have been shown and described for conveying remaining battery life for earpiece wearables. The present invention contemplates numerous variations, options, and alternatives.

What is claimed is:

1. A system comprising:
   a left earpiece comprising a left earpiece housing and a right earpiece comprising a right earpiece housing and a radio transceiver disposed within at least one of the left earpiece and the right earpiece; and
   a software application executable on a computing device having a screen display element in operative communication with the radio transceiver;

wherein the left earpiece further comprises a left corona operatively connected to the left earpiece housing and comprising a light tube and at least one lighting element;

wherein the right earpiece further comprises a right corona operatively connected to the right earpiece housing and comprising a light tube and at least one lighting element;

wherein the software application provides a visual representation of the left earpiece and a visual representation of the right earpiece on the screen display element of the computing device and wherein the visual representation of the left earpiece indicates a remaining charge for the left earpiece and wherein the visual representation of the right earpiece indicates a remaining charge for the right earpiece;

wherein the visual representation of the right earpiece includes a representation of the right corona of the right earpiece lit to a color indicative of the remaining charge of the right earpiece and wherein the visual representation of the left earpiece includes a representation of a lighting element of the left corona of the left earpiece lit to a color indicative of the remaining charge of the left earpiece.

2. The system of claim 1 wherein the radio transceiver transmits a historical profile of battery usage of the left earpiece and the right earpiece to the computing device.

3. The system of claim 1 wherein the computing device is a mobile device.

4. A method for displaying battery life of a left earpiece and a right earpiece on a computing device, the method comprising:

receiving battery life information from the left earpiece and the right earpiece, the battery life information communicated using a radio transceiver disposed within at least one of the left earpiece and the right earpiece;

displaying the battery life information on a screen display element of the computing device using a software application stored on the computing device; and synchronizing the battery life information to a visual representation of the left earpiece and the right earpiece displayed on the screen display element of the computing device using the software application, wherein the visual representation of the left earpiece and the right earpiece further displays the battery life information of the left earpiece and the right earpiece;

wherein the visual representation of the left earpiece and the right earpiece further comprises a left earpiece corona and a right earpiece corona, wherein the left earpiece corona is chromatically illuminated in proportion to the remaining battery life of the left earpiece and the right earpiece corona is chromatically illuminated in proportion to the remaining battery life of the right earpiece.

5. The method of claim 4 further comprising receiving a historical profile of the battery life of the at least one wireless earpiece.

6. A system comprising:

a left earpiece comprising a left earpiece housing and a right earpiece comprising a right earpiece housing and a radio transceiver disposed within at least one of the left earpiece and the right earpiece; and a software application executable on a computing device having a screen display element in operative communication with the radio transceiver;

wherein the left earpiece further comprises a left corona operatively connected to the left earpiece housing and comprising a light tube and at least one lighting element;

wherein the right earpiece further comprises a right corona operatively connected to the right earpiece housing and comprising a light tube and at least one lighting element;

wherein the software application provides a visual representation of the left earpiece and a visual representation of the right earpiece on the screen display element of the computing device and wherein the visual representation of the left earpiece and the right earpiece further comprises a left earpiece corona and a right earpiece corona, wherein the left earpiece corona is chromatically illuminated in proportion to the remaining battery life of the left earpiece and the right earpiece corona is chromatically illuminated in proportion to the remaining battery life of the right earpiece.

7. The system of claim 6 wherein the radio transceiver transmits a historical profile of battery usage of the left earpiece and the right earpiece to the computing device.

8. The system of claim 6 wherein the computing device is a mobile device.

* * * * *